US007015458B2

(12) United States Patent
Endicott

(10) Patent No.: US 7,015,458 B2
(45) Date of Patent: Mar. 21, 2006

(54) HIGH DENSITY FIBER OPTIC OUTPUT INTERFACE AND SYSTEM

(75) Inventor: Eric Endicott, Lake Mary, FL (US)

(73) Assignee: Emerging Manufacturing Technology, Inc., Lake Mary, FL (US)

( * ) Notice: Subject to any disclaimer, the term of this patent is extended or adjusted under 35 U.S.C. 154(b) by 294 days.

(21) Appl. No.: 10/615,069

(22) Filed: Jul. 8, 2003

(65) Prior Publication Data

US 2004/0099797 A1  May 27, 2004

Related U.S. Application Data

(60) Provisional application No. 60/417,572, filed on Oct. 10, 2002.

(51) Int. Cl.
 *G01J 1/34* (2006.01)
(52) U.S. Cl. .................... 250/227.21; 250/227.22; 398/113
(58) Field of Classification Search ........... 250/227.22, 250/227.11, 227.21, 214 SW; 398/106–114, 398/23, 28, 172, 200; 359/272; 385/11, 385/15, 16; 340/600; 200/61.02
See application file for complete search history.

(56) References Cited

U.S. PATENT DOCUMENTS

| | | | | |
|---|---|---|---|---|
| 4,422,180 A | * | 12/1983 | Wendt ........................ 398/110 |
| 4,742,678 A | | 5/1988 | Bartholomew et al. ....... 60/516 |
| 4,773,723 A | * | 9/1988 | Cuda ........................... 385/89 |
| 4,919,503 A | | 4/1990 | Mroynski ..................... 385/25 |
| 4,935,850 A | | 6/1990 | Smith, Jr. .................... 362/27 |
| 5,193,893 A | | 3/1993 | Mitko ........................ 362/496 |
| 5,434,756 A | | 7/1995 | Hsu et al. .................... 362/552 |
| 5,457,757 A | * | 10/1995 | Kidder ......................... 385/16 |
| 5,479,276 A | | 12/1995 | Herbermann .................. 349/5 |
| 5,495,400 A | | 2/1996 | Currie ......................... 362/551 |
| 5,606,637 A | | 2/1997 | Dolby ......................... 385/115 |
| 5,709,245 A | | 1/1998 | Miller .................... 137/625.64 |
| 5,875,818 A | | 3/1999 | Takats et al. .......... 137/625.64 |
| 6,206,533 B1 | | 3/2001 | Shi ............................. 362/23 |
| 6,296,383 B1 | | 10/2001 | Henningsen ................ 362/552 |
| 6,452,603 B1 | | 9/2002 | Dignam ..................... 345/582 |
| 6,491,420 B1 | | 12/2002 | Scifres ....................... 362/553 |
| 6,492,636 B1 | | 12/2002 | Chen et al. ............ 250/227.14 |
| 6,685,159 B1 | * | 2/2004 | Schnell ........................ 251/59 |

FOREIGN PATENT DOCUMENTS

JP         04062515 A   *  2/1992

* cited by examiner

*Primary Examiner*—Thanh X. Luu
*Assistant Examiner*—Stephen Yam
(74) *Attorney, Agent, or Firm*—James H. Beusse; Buesse Brownlee Wolter Mora & Maire, P.A.

(57) ABSTRACT

A fiber optic control system for controlling remotely located devices. The control system includes an illumination source for producing a light beam and a plurality of optical fibers. Each fiber is arranged to receive a respective portion of a light beam at a coupling end. A planar light switch, including a plurality of light attenuating pixels, is positioned between the illumination source and the optical fiber coupling ends. Each of the pixels of the planar light switch is electronically controllable for selectively coupling portions of the light beam to respective coupling ends of the optical fibers. A plurality of light activated circuits are optically coupled to a respective illumination ends of the optical fiber. The light activated circuits are responsive to the respective portion of the light beam radiated from the respective illumination ends for providing a control signal to a remotely located device.

15 Claims, 4 Drawing Sheets

HIGH DENSITY FIBER OPTIC OUTPUT INTERFACE AND SYSTEM

SPECIFIC DATA RELATED TO THE INVENTION

This application claims the benefit of U.S. Provisional Application No. 60/417,572 filed Oct. 10, 2002, incorporated herein by reference.

FIELD OF THE INVENTION

The present invention relates to control systems and, more particularly, to a system for controlling remote devices with optical fiber conductors.

BACKGROUND OF THE INVENTION

Current technology for aircraft controls, flight simulator control systems, and manufacturing control systems utilize extensive numbers of remotely controlled devices to actuate various systems or features that may be present or used in such systems. For example, an aircraft may include thousands of remotely controlled devices for actuating movable parts or features of the aircraft such as elevators, ailerons, flaps, and the like. Each of these devices may be remotely controlled from a central controller via an electrical signal provided through a current conductor wired from the controller to the remote device. Input to the central controller may be provided by sensors, such as switches or relays activated by a pilot from a cockpit control panel. The central controller activates a switch or relay corresponding to an input from the pilot to provide an appropriate control signal to the corresponding device. In the aircraft environment, the large number of remotely controlled devices requires a correspondingly large number of conductor cables to provide control signals to each of the devices. Such cabling typically comprises wire bundles that may be multiple inches in diameter. The amount of wiring used in applications, such as in an aircraft, may actually reach numbers that are measured in miles of wire. Problems associated with conventional electrically wired remote control technology includes the weight of the conductors, relatively high power requirements, EMI susceptibility, complicated electronics for monitoring the switches, corrosion susceptibility, relatively high heat production, electronic crosstalk between conductors, and difficult maintainability.

Accordingly, there is a need for a system that will reduce the volume of conductors and provide for a more reliable method for controlling remote devices.

SUMMARY OF THE INVENTION

A fiber optic control system is described herein as including an illumination source for producing a light beam and a multitude of optical fibers. Each optical fiber is arranged to receive a respective portion of the light beam at a coupling end of the fiber and to conduct the respective portion of the light beam to an illumination end of the optical fiber. The system also includes a planar light switch including a plurality of light attenuating pixels. The light switch is positioned between the illumination source and the optical fiber coupling ends. Each of the pixels of the light switch are electronically controllable for selectively coupling portions of the light beam to respective coupling ends of the optical fibers. The system also includes a multitude of light activated circuits. Each light activated circuit is optically coupled to a respective illumination end of the optical fiber and responsive to the respective portion of the light beam radiated from the respective illumination end for providing a control signal to a remotely located device.

BRIEF DESCRIPTION OF THE DRAWINGS

The present invention will become apparent from the following detailed description of the invention when read with the accompanying drawings in which.

DETAILED DESCRIPTION OF THE INVENTION

The present invention is directed to a system and method that uses a light source coupled through a planar light switch to a plurality of optical fibers for control of remote devices. The system may be used in high-density control systems such as used in an aircraft, aircraft simulator, or a manufacturing control system. The present invention replaces the wiring to remote devices by utilizing fiber optics. The fiber optics can be remotely illuminated from a single source with light carried to each of the remote locations by a single fiber. The fibers can be exceedingly small, thus reducing the wiring necessary to carry electrical power. Some advantages of using fiber optics include reduced weight, reduced power requirements, increased electromagnetic interference resistance, simpler electronics, corrosion resistance and water resistance. In addition, the system can be implemented with simple redundancy by using more than one fiber to conduct redundant signals. Further, the system can be less expensive, eliminate cross talk, be easier to construct, have greater reliability, decreased repair time and can be configured with higher density than is possible with electrical conductors. In addition, mechanical switches and relays used in conventional remote control applications can be replaced with a simple, lightweight, and reliable planar light switch, such as a liquid crystal display (LCD), having light attenuation controllable pixels for selectively coupling light to each of the fiber optics to control a corresponding remote device.

Figure 1:
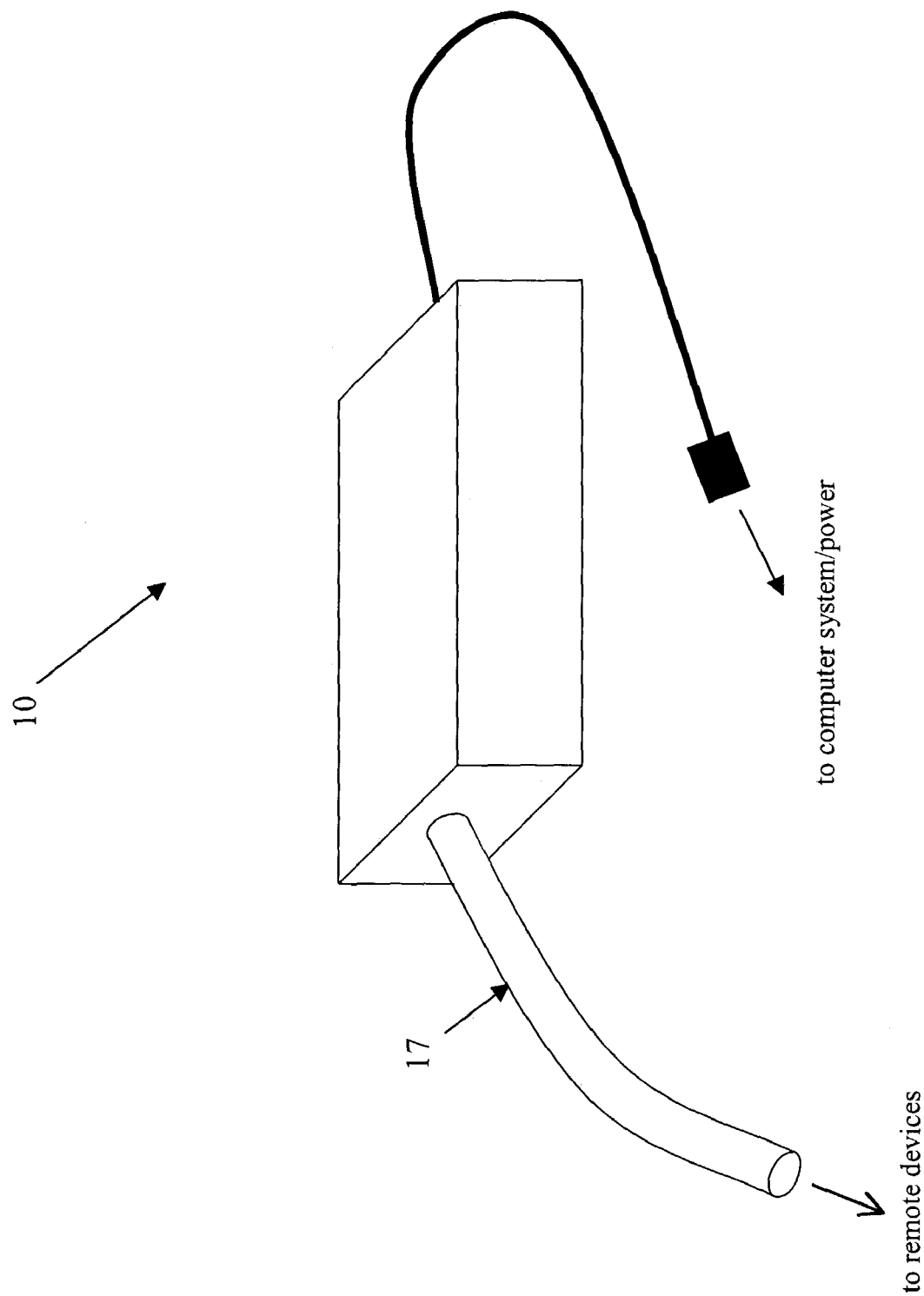
FIG. 1 illustrates a simplified mechanical structure of a container in which there is provided a remote controller.

FIG. 1 illustrates a simplified mechanical structure of a system in which there is provided a container 10 in which may be located a light source and a planar light switch. The container receives a fiber optic bundle 17 and positions the ends of the fiber optics to receive light from the light source through the planar light switch in the box 10. The box 10 may be connected to a computer system that enables control of the lights supplied to each of the optical fibers in the fiber optic bundle 17. A power source is connected to the box 17 to provide power for the planar light switch and light.

Figure 2:
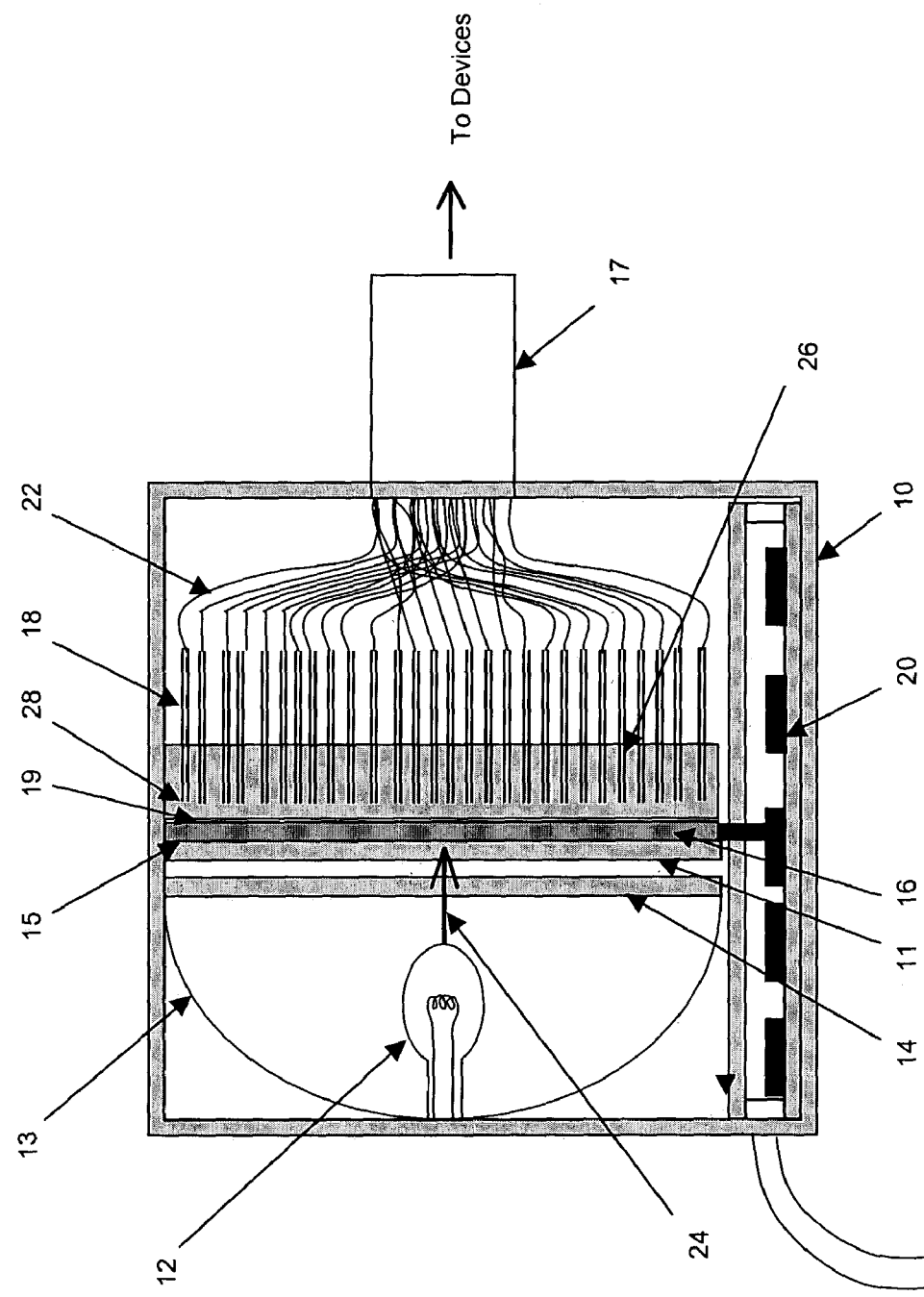
FIG. 2 illustrates a remote controller including a light source, a planar light switch and fiber optic array.

FIG. 2 illustrates how the container of FIG. 1 may be constructed internally. Power is supplied to a light source 12 that directs light 24 through a heat filter 14 or a lens 11 onto an illumination side 15 of the liquid crystal display (LCD) 16. The optical fibers 22 are coupled into the box 10 through fiber optic guides 18 that align, generally perpendicularly, the illumination ends 28 of the fibers 22 with a transmission side 19 of the LCD 16. The LCD 16 provides individual pixels that can be controlled by a controller 20 to allow light 24 to go through the LCD 16 and be passed to each of the optical fibers 22 or be blocked by the LCD 16 to turn off the light 24, preventing passage of the light to the fibers 22. Accordingly, the controller allows individual control of light 24 supplied on each optical fiber 22 in the fiber optic bundle 17. The light source 12 may be any of the well-known light producing devices for use with optical fibers 22 including incandescent, fluorescent, electroluminescent, or high intensity discharge lighting elements. In addition, the light source 12 may be a semiconductor light source, such as a light emitting diode (LED), or laser semiconductor, such as a side emitting or surface emitting laser semiconductor. The light source 12 includes a reflector 13 that may be a mirror designed to direct the light 24 as a broad beam onto the LCD 16. Alternately, a simple glass or plastic lens 11, or any other type of element, such as a lens having a multitude of smaller lenses, to focus portions of the light beam 24 on individual pixels of the LCD 16. Heat shields 14 of the type illustrated in 14 are well known in the art and may comprise an infrared filter or other type of heat blocking device. Depending on the size of the box 10, it is possible that the heat shield 14 could be eliminated and other cooling arrangements provided such as a fan.

The fiber optic array 26 may be glass or plastic light conducting optical fibers 22. The optical fibers 22 may be arranged in such a fashion as to create a two-dimensional plane so that light 24 impinging on the light coupling ends 28 of the optical fibers 22 can be switched on and off with the LCD 16 to control a remote device (not shown). In a further aspect of the invention, the individual optical fibers 22 can be glued or mechanically held in place in, for example, in a bundled, two-dimensional fiber optic array 26 so that the LCD 16 will be able to switch light to multiple optical fibers 22 simultaneously. In an aspect of the invention, the optic fibers 22 may be arranged such that one fiber 22 corresponds to one pixel on the LCD 16. A typical array 26 would be a square or rectangular configuration of the optical fibers 22. The light coupling ends 28 of the optical fibers 22 may be spaced away from the LCD 16 instead of abutting a face of the LCD 16 to mitigate stray light coupled from the face of the LCD 16 from entering the light coupling ends 28.

The LCD 16 can be any type of display that provides a one-to-one correspondence between the optical fibers 22 in the fiber optic array 26 and the pixels of the LCD 16. For example, it is believed that an LCD 16 having a 640 by 480 pixel array may control in excess of 300,000 devices. The LCD 16 may incorporate focusing lenses to focus light onto each fiber 22. The type of LCD 16 used may be of the type that is black when power is off to facilitate startup in an "Off." In addition, the individual pixels of the LCD 16 may be selectively turned on or off after the LCD 16 has been powered on. Further, the LCD 16 may be of the type that provides complete blocking of light 24 from the light source 12 to the associated optical fiber 22 when the particular pixel is in an "off" position, and allows passage of light when the pixel is turned "on" to provide, for example, a digital mode of operation. In another form, the LCD 16 may include an analog mode of operation in which individual pixels may provide variable light attenuation, such as a gray scale capability, to provide a continuously variable intensity of light transmitted through the LCD 16.

The LCD controller 20 provides an interface to a computer system (not shown) and converts the computer signals into appropriate controls for the LCD 16. The LCD controller 20 for the LCD 16 is of a type well known in the art that allows individual control of the pixels of the LCD 16. The communication protocol between the LCD controller 20 and the computer system can be any of the conventional types of protocols that allow information to be passed from a PC to an LCD control circuit. For example, the communication protocol could be TCP/IP, or RS232, USB, Parallel, RS422, or other control protocol.

Figure 3:
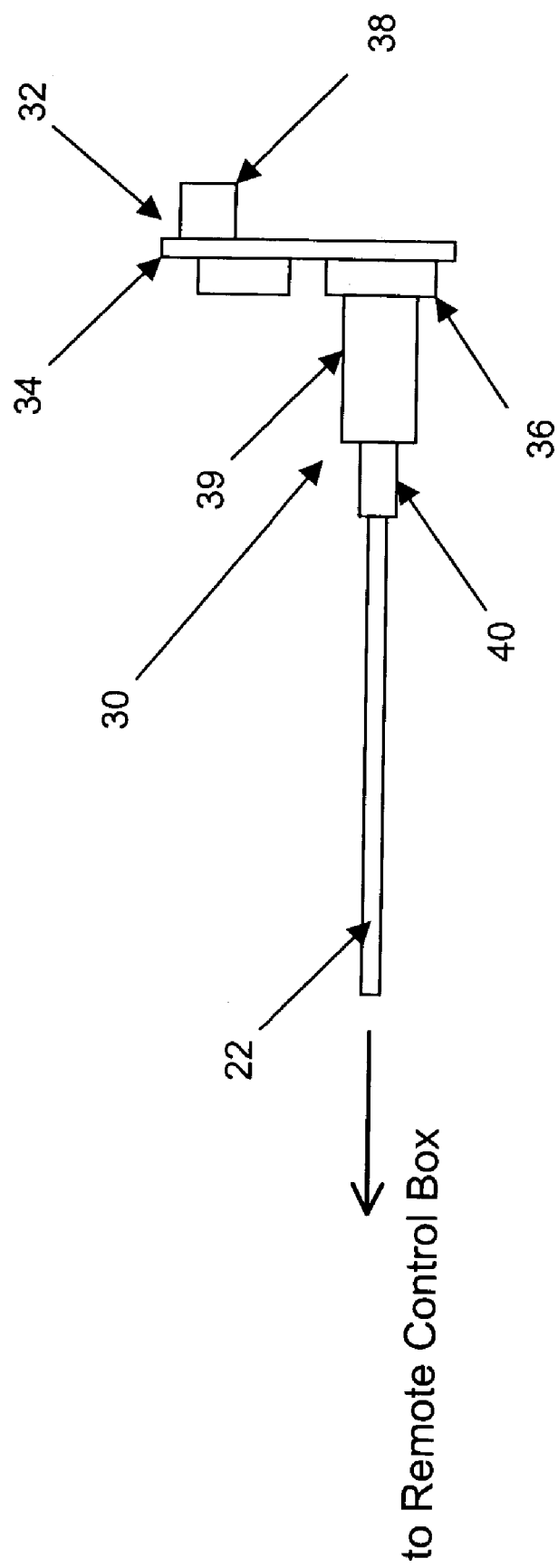
FIG. 3 illustrates an optically switched device for remote control.

FIG. 3 illustrates an optically switched device 32 for optical remote control. Each of the optical fibers 22 in the optical fiber bundle 17 may be coupled to a respective optically switched device 32 at an illumination end 30. Light 24 coupled to the optical fiber 22 by the LCD 16 at the coupling end 28 (as shown in FIG. 2), is conducted along the optical fiber 22 which is optically coupled to a remote optically switched device 32 at the illumination end 30. Upon detecting light radiating from the illumination end 30 of the optical fiber 22, the optically switched device 32 converts the detected light radiated by the optical fiber 22 at the illumination end 30 into a signal, such as a predetermined voltage level, for controlling a remote device, such as an actuator (not shown). The optically switched device 32 may include a phototransistor 36 for detecting light from the optical fiber 22 mounted on a control circuit board 34. The device 32 may further include appropriate circuitry for converting the detected light into a control signal provided to a remote device. The remote device may be coupled to the control circuit board 34 by a connector 38. In other forms, a photo-resistor, a photodiode, or another type of device for converting an optical signal into an electrical signal may be used instead of a phototransistor 36. The optically switched device 32 may further include a female adapter 39 for receiving a male adapter 40 attached to the fiber optic end 30 for ease of assembly and disassembly. In an aspect of the invention, multiple optical fibers 22 and a corresponding multiple of optically switched devices 32 could be ganged to provide a digital control scheme for controlling a remote device. For example, eight optical fibers 22 and eight corresponding optically switched devices 32 could be used to provide an eight-bit controller having 256 levels of digital control. In one form, the illumination ends 30 of the optical fibers 22 may be positioned in an instrument display so that light 24 radiated from the optical fibers 22 may provide usable backlighting or indicator lights, such as for cockpit panels and switches, or other applications.

Figure 4:
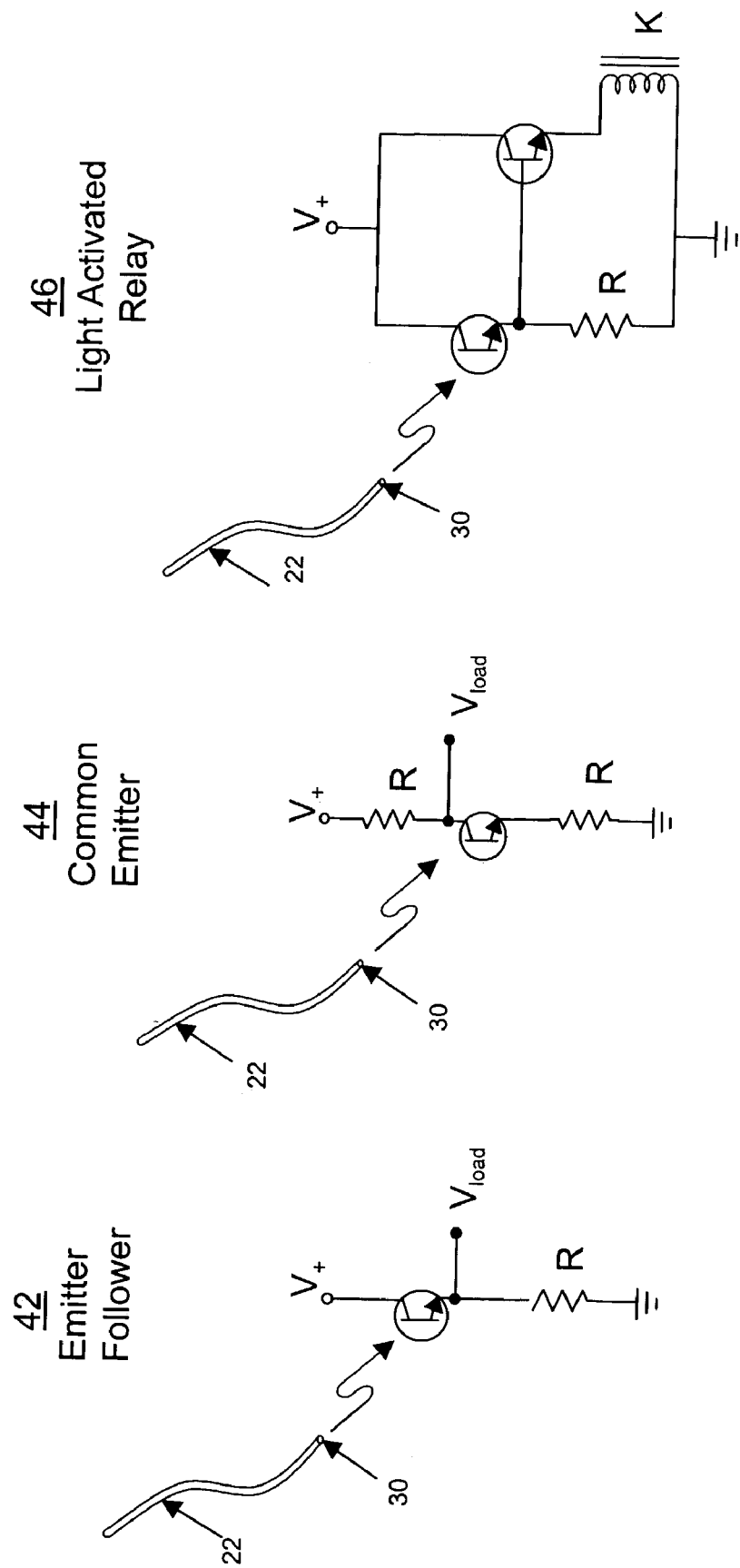
FIG. 4 illustrates exemplary light activated circuits.

FIG. 4 illustrates exemplary light activated circuits that may be used in the optically switched device 32 of FIG. 3. For example, an emitter-follower circuit 42, a common emitter circuit 44, or a light activated relay circuit 46 may be used to convert an optical signal provided by the optical fiber 22 at the illumination end 30 into an electrical signal. The emitter-follower circuit 42 and the common emitter circuit 44 detect light radiated from the fiber optic 22 and convert the light to a voltage, Vout, determined by the source voltage, V+, and the value of the resistors, R, used in the circuit. The light activated relay circuit 46 is used to detect light radiated from the fiber optic 22 and energize a relay K.

While the invention is disclosed in what is presently considered to be one form, it will be appreciated that the concept disclosed here is to replace electrical copper or aluminum wiring in high density applications with optical fibers 22 conducting light signals for control of remote devices. While the control is implemented using a liquid crystal display or LCD, it will be appreciated that any other form of device that provides point source control of light being introduced into an optical fiber could be utilized in the present application. While the embodiments described herein suggests that a broadband light may be used for the invention, it will be apparent that a narrow frequency beam such as a laser beam may be an alternate type of light that could be used for this invention. Further, with a broadband light, an optical multiplexer could also be incorporated to separate the light into various wave lengths that are applied to different sets of optical fibers in order to isolate different fiber bundles. Still further, the particular array of the optical fibers within the optical fiber holder may take various configurations and shapes depending upon the particular application and the manner in which it is desired to organize and arrange the optical fibers so as to be able to detect the particular switch or sensor being monitored.

While only certain preferred features of the invention have been shown by way of illustration, many modifications and changes will occur to those skilled in the art. It is, therefore, to be understood that the present claims are intended to cover all such modifications and changes, which fall within the true spirit of the invention.

What is claimed is:

1. A fiber optic control system comprising:
    an illumination source for producing a light beam;
    a plurality of optical fibers, each fiber arranged to receive a respective portion of the light beam at a coupling end and to conduct the respective portion of the light beam to an illumination end;
    a planar light switch comprising a plurality of light attenuating pixels, the light switch positioned between the illumination source and the optical fiber coupling ends, each of the pixels being electronically controllable for selectively coupling portions of the light beam to respective coupling ends of the optical fibers; and
    a plurality of optically operated devices for converting received optical signals to corresponding electrical signals, each optically operated device optically coupled to the respective illumination end of the optical fiber and responsive to the respective portion of the light beam radiated from the respective illumination end for providing an electrical control signal corresponding to the respective portion of the light beam received by the optically operated device for controlling a remotely located device in communication with the optically operated device.

2. The system of claim 1, further comprising a controller coupled to the planar light switch for controlling a light attenuation property of each of the pixels of the planar light switch.

3. The system of claim 1, wherein the light activated circuit further comprises at least one of a phototransistor, a photo diode, or a photo resistor.

4. The system of claim 1, further comprising a lens positioned between the illumination source and the planar light switch for directing the light beam onto the planar light switch.

5. The system of claim 1, wherein at least one pixel of the planar light switch is aligned with a respective coupling end of at least one optical fiber.

6. The system of claim 1, wherein the planar light switch is a liquid crystal display.

7. The system of claim 1, wherein the illumination source further comprises an electroluminescent light source.

8. The system of claim 1, wherein the illumination source further comprises a semiconductor light source.

9. The system of claim 8, wherein the semiconductor light source, is a light emitting diode or a laser semiconductor.

10. The system of claim 8, wherein the semiconductor light source further comprises an array of semiconductor light sources.

11. The system of claim 1, further comprising a heat shield mounted between the illumination source and the planar light switch for reducing heat transmitted from the illumination source to the planar light switch.

12. The system of claim 1, wherein the plurality of optical fibers are arranged in a two-dimensional array at respective coupling ends.

13. A method of optically controlling remote devices comprising:
    directing a light beam at a first side of a selectively transmissive planar light switch;
    allowing portions of the light beam to be transmitted through the switch onto respective coupling ends of a plurality of optical fibers positioned for receiving portions of the light beam at a second side of the switch; and
    optically coupling respective illumination ends of the optical fibers to respective optically operated devices for converting received optical signals to corresponding electrical signals so that the portion of the light radiated from the illumination end activates the optically operated device to generate an electrical control signal corresponding to the portion of the light received by the optically operated device for controlling a remote device in communication with the optically operated device;
    wherein allowing portions of the light beam to be transmitted through the switch further comprises selectively controlling a light attenuation property of each of a plurality of pixels of the light switch.

14. The method of claim 13, wherein the selectively transmissive planar light switch is a liquid crystal display.

15. The method of claim 13, further comprising aligning at least one pixel of the light switch with a respective coupling end of at least one optical fiber.

* * * * *